United States Patent [19]

Terashita et al.

[11] Patent Number: 5,602,851
[45] Date of Patent: Feb. 11, 1997

[54] MULTI-PORT BRIDGE

[75] Inventors: Yoshihiko Terashita, Yamato; Yoshikazu Sato, Yokohama; Nobuyuki Ishikawa, Yamato, all of Japan

[73] Assignee: International Business Machines Corporation, Armonk, N.Y.

[21] Appl. No.: 336,152

[22] Filed: Nov. 8, 1994

[30] Foreign Application Priority Data

Dec. 22, 1993 [JP] Japan .................................. 5-234489

[51] Int. Cl.$^6$ ................................................ H04L 12/66
[52] U.S. Cl. .............................................. 370/403
[58] Field of Search ................. 370/85.13, 79, 370/85.5, 85.4, 85.12, 85.13, 85.14, 85.15, 94.1, 110.1, 16.1

[56] References Cited

U.S. PATENT DOCUMENTS

| | | | |
|---|---|---|---|
| 5,086,426 | 2/1992 | Tsukakoshi et al. | 370/85.13 |
| 5,214,646 | 5/1993 | Yacoby | 370/85.13 X |
| 5,345,447 | 9/1994 | Noel | 370/85.13 |
| 5,379,292 | 1/1995 | Kurata et al. | 370/85.13 |
| 5,388,089 | 2/1995 | Odaka et al. | 370/85.13 |
| 5,394,402 | 2/1995 | Ross | 370/85.13 |
| 5,430,728 | 7/1995 | Narayanan et al. | 370/85.13 |
| 5,448,565 | 9/1995 | Chang et al. | 370/85.13 |

FOREIGN PATENT DOCUMENTS

| | | | |
|---|---|---|---|
| 289640 | 11/1989 | Japan | H04L 11/00 |
| 040623 | 2/1991 | Japan | H04L 12/42 |
| 004635 | 1/1992 | Japan | H04L 12/28 |
| 084527 | 3/1992 | Japan | H04L 12/28 |

*Primary Examiner*—Benedict V. Safourek
*Assistant Examiner*—Ricky Q. Ngo
*Attorney, Agent, or Firm*—Joscelyn G. Cockburn

[57] ABSTRACT

In accordance with the present invention, there is provided a multi-port bridge where problems in conventional virtual bridging are solved, and especially a multi-port bridge which can be managed with a program that manages only two-port bridges. The multi-port bridge comprises, in terms of hardware, one adapter such a TRN adapter 70 connected to one port 50, other adapters such as other ISDN adapters 71 to 77 connected to a plurality of other ports 51 to 57, and processor 86 for providing virtual bridges and a virtual Token-Ring between one adapter and other adapters. Processor 86 provides by means of a program a virtual bridge module 120 having a bridging function to TRN adapter 70 connected to one port 50, and virtual bridge modules 121 to 127 having a bridging function to other ISDN adapters 71 to 77 connected to ports 51 to 57, respectively. Further, processor 86 provides by means of the program virtual Token-Ring module 128 for coupling these virtual bridge modules 121 to 127.

1 Claim, 6 Drawing Sheets

MULTI-PORT BRIDGE

FIELD OF THE INVENTION

This invention relates to bridges for interconnecting local area networks or LANs in their communications system and more particularly to a bridge having a plurality of ports, i.e. multi-port bridge for interconnecting LANs.

DESCRIPTION OF THE PRIOR ART

As downsizing and client-server systems has become popular in the industry, local area networking, that is to build LANs, has progressed, and there has already been a shift of the world of LAN from local area networks in a limited environment to wider or global area networks that interconnects LANs which are geographically distant from each other. In such networking trend, the industry has turned to and developed bridges which are required for interconnecting LANs, and especially multi-port bridges which are capable of interconnecting a number of LANs.

On the other hand, there has been a problem in network management due to expansion of LANs. Examples of a means for managing LAN network resources, such as LAN station, bridge, and concentrator, includes the LAN network management program market by several different vendors. However, this program manages only two-port bridges, and not multi-port bridges (those having three or more ports). Therefore, conventional multi-port bridges have been implemented with the following methods.

1. A method which does not support the LAN network management program.

This method includes the function of frame transfer, is compact, and provides high performance. However, the method is out of management by the LAN network management program and has no such functions as network fault alert and remote modification of configuration information. Thus, this approach is not suitable for large networks where multi-port bridges are required.

2. Virtual bridging.

Virtual bridging is a method to support the LAN network management program by implementing a number of virtual two-port bridges within a multi-port bridge.

As shown in FIG. 7, port P1 of Token-Ring network (hereinafter called TRN) TRN1 is made a primary port and ports P2 to Pn of other networks TRN2 to TRNn become secondary ports. virtual two-port bridges VB2 to VBn are set up between the primary port and each secondary port. Each virtual bridge is managed by the LAN network management program.

With this method, however, the actual frame flow is different from the network configuration known to the LAN network management program because of the absence of an internal path between the secondary ports. This can cause drawbacks in network management. For example, a frame to be sent from port P2 to port P3 (the one which flows between the secondary ports) goes through TRN2, port P2, virtual bridge VB2, port P1, TRN1, port P1, virtual bridge VB3, port P3, and TRN3, thus causing a workload on port P1 and TRN1. Typically, to eliminate this workload, the frame is sent directly from port P2 to port P3, whereas a report is made to the LAN network management program which says the frame has been transferred through the path described above. This pretending report does not provide accurate statistics, and necessitates different structures for operating the portions of bridge management and frame transfer, arising a problem in implementation.

To overcome these problems, as shown in FIG. 8, a method was provided which builds virtual bridges VBs between every pair of ports. With this method, however, as the number of ports increases, the required number of virtual bridges increases explosively (assuming the number of ports is n, the number of virtual bridges is $n*(n-1)/2$). It is difficult to accommodate such an enormous number with hardware. In terms of software, it is said that the required storage space increases as the number of virtual bridges increases and reaches its limit with three or four ports. Currently the prevalent multi-port bridge supports three or four ports. However, this method will be ineffective when a bridge which supports more ports than that required now is demanded as networks are expanded.

As a common drawback in such virtual bridging, multiple virtual bridges shares a single port. The LAN network management program uses media access control, or MAC, addresses for the port of each bridge as a parameter for recognizing the bridge, and does not allow these addresses to duplicate with those for other bridges or stations, so the virtual bridges that share the port requires dummy addresses. In addition, since the MAC address is not recognized by the Token-Ring adapter, there needs some method to receive the LAN management frame being sent to this address.

SUMMARY OF THE INVENTION

A principal object of the present invention is to provide a multi-port bridge which overcomes the drawbacks in conventional virtual bridging.

Another object of the present invention is to provide a multi-port bridge which can be managed with a program that manages only two-port bridges, such as an existing LAN network management program.

Still another object of the present invention is to provide a multi-port bridge which permits greater expansion and flexible designs in interconnecting multiple LANs.

Objects of the present invention are accomplished by providing a virtual Token-Ring means which provides a virtual Token-Ring within a multi-port bridge and arranging a plurality of virtual bridge means around the Token-Ring means.

The multi-port bridge hardware comprises one adapter such as TRN adapter to be connected to one port, other adapters such as TRN adapter or Integrated Services Digital Network (ISDN) adapter to be connected to a plurality of other ports, and a processor for providing a plurality of virtual bridge means and a virtual Token-Ring means between one adapter and other adapters.

Such processor comprises, by a program applied to it, one virtual bridge means connected to one port, a plurality of other virtual bridge means corresponding and connected to other ports, and a virtual Token-Ring means provided between one virtual bridge means and other virtual bridge means.

Among others, one virtual bridge means includes a media access control means having a LAN media access control function, a logical link control means having a logical link control function, a bridge management means having similar functions as the LAN bridge server and LAN reporting for managing virtual bridge means through the logical link control means, and a frame transfer means for frame transfer between a LAN and the virtual Token-Ring means.

The virtual Token-Ring means includes a media access control means having a media access control function for the virtual Token-Ring means.

Other virtual bridge means includes a frame transfer means for frame transfer between a LAN or ISDN and the virtual Token-Ring means, a logical link control means having a logical link control function, a bridge management means having similar functions as the LAN bridge server and LAN reporting for managing virtual bridge means through the logical link control means, a media access control means having a LAN media access control function or a media access control means having an ISDN media access control function.

In the multi-port bridge according to the invention, since a virtual Token-Ring having an equivalent function with an actual Token-Ring is provided within bridges, frame flow can be matched with the network configuration recognized by the LAN network management program when viewed from the program or a station. Thus, it is possible to lower the number of virtual bridges which increases due to the increased number of ports (assuming the number of ports is n, the number of virtual bridges is n).

By providing the virtual Token-Ring and virtual bridges as a set of modules, not only local bridges between LAN media but remote bridges which use a global area network such as ISDN and X.25 can be readily built. Though dummy addresses are still required, receiving LAN management frames at dummy addresses will be no longer a problem since a virtual Token-Ring module can be used to deal with all frames which run through the virtual Token-Ring (the frames sent from a virtual bridge module or destined to a dummy address).

The foregoing and other features and advantages of the invention will be more fully described in the accompanying drawings.

DESCRIPTION OF THE PREFERRED EMBODIMENT

Figure 1:
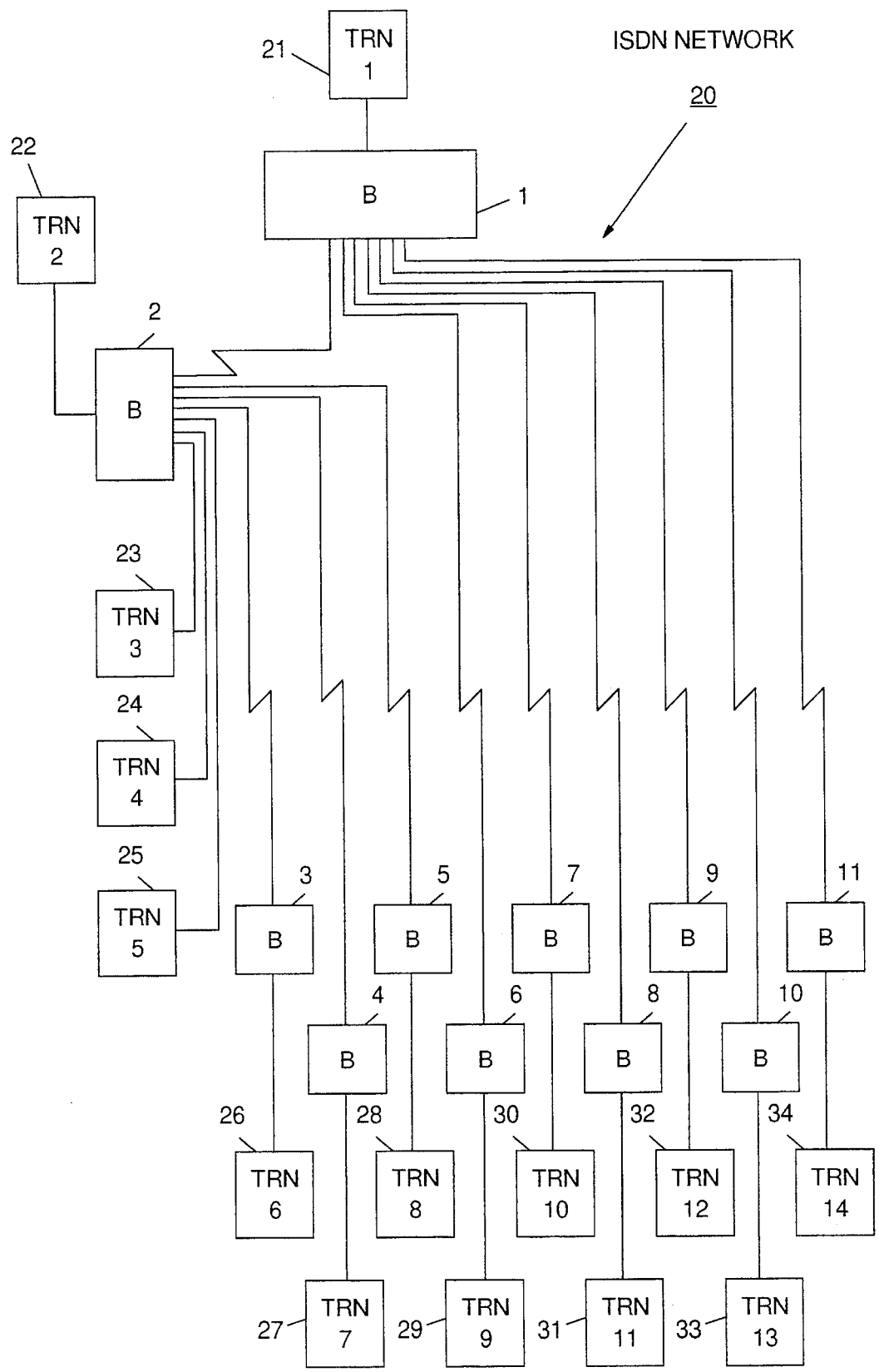
FIG. 1 shows a graphical representation of a communications system using the multi-port bridge in accordance with the present invention.

FIG. 1 shows a communications system using the multi-port bridge according to the present invention. Bridges 1 and 2 are multi-port bridges and bridges 3 to 11 are two-port bridges. Although bridges 1 and 2 are shown to have eight ports, respectively, it is understood that the multi-port bridge according to the invention is not limited to such numbers and the number of ports can be further increased.

Bridge 1 connects segment 21 of Token-Ring network TRN1 to segments 22 to 34 of other Token-Ring networks TRN2 to TRN14 via ISDN network 20. Bridge 2 connects segment 22 of Token-Ring network TRN2 to segment 21 of Token-Ring network TRN1 and segments 26 to 34 of Token-Ring networks TRN6 to TRN14 via ISDN network 20. Bridge 2 also connects segment 22 of Token-Ring network TRN2 to segments 23 to 25 of other Token-Ring networks TRN3 to TRN5 without ISDN network 20.

Bridge 3 connects, via ISDN network 20, segment 26 of Token-Ring network TRN6 to segments 21 to 25 of other Token-Ring networks TRN1 to TRN5 and segments 27 to 34 of Token-Ring networks TRN7 to TRN14. Like bridge 3, bridges 4 to 11 connects, via ISDN network 20, corresponding Token-Ring network segments to other Token-Ring network segments.

Figure 2:
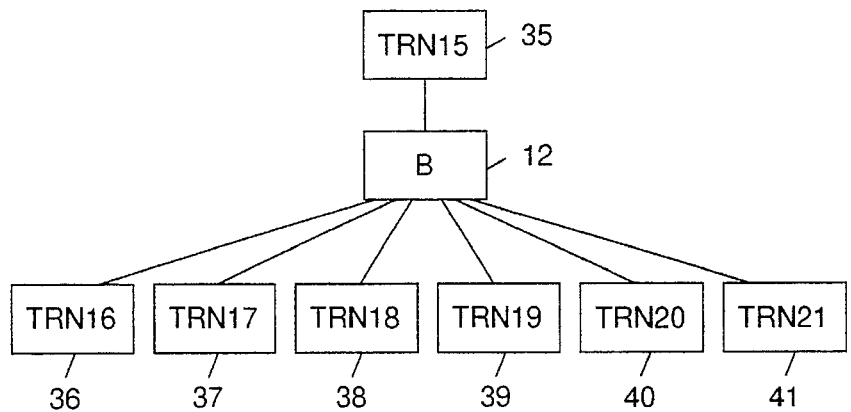
FIG. 2 shows a graphical representation of an alternative communications system using the multi-port bridge in accordance with the present invention.
Figure 7:
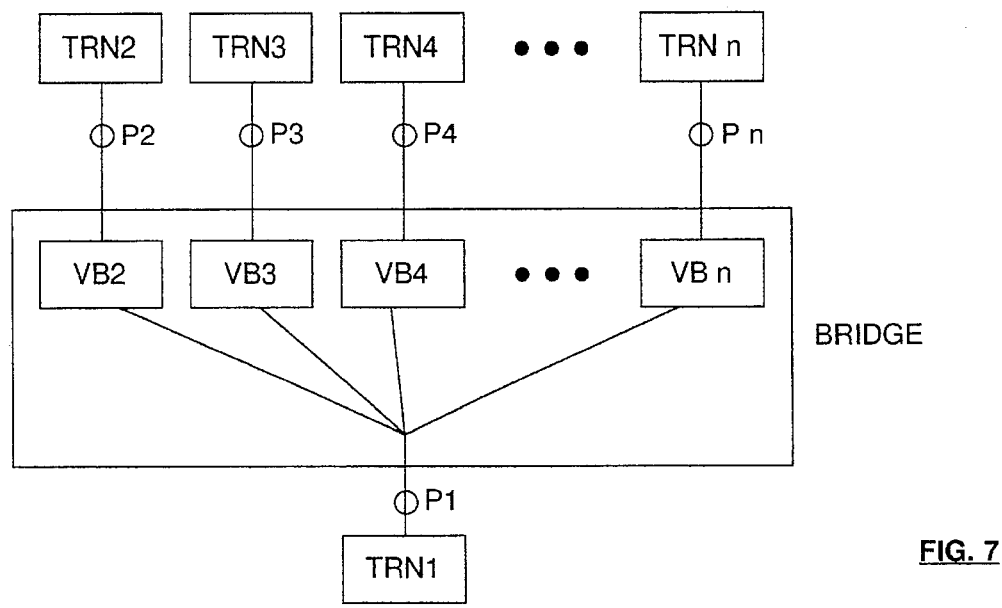
FIG. 7 shows a graphical representation of conventional virtual bridging.
Figure 8:
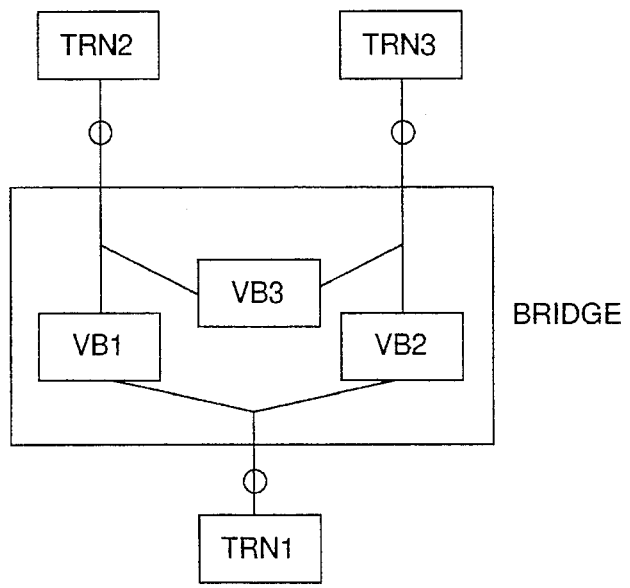
FIG. 8 shows an alternative graphical representation of conventional virtual bridging.

FIG. 2 shows an alternate communications system using the multi-port bridge according to the invention. Bridge 12, a multi-port bridge, interconnects segments 36 to 41 of Token-Ring networks TRN16 to TRN21 without using ISDN network 20.

Figure 3:
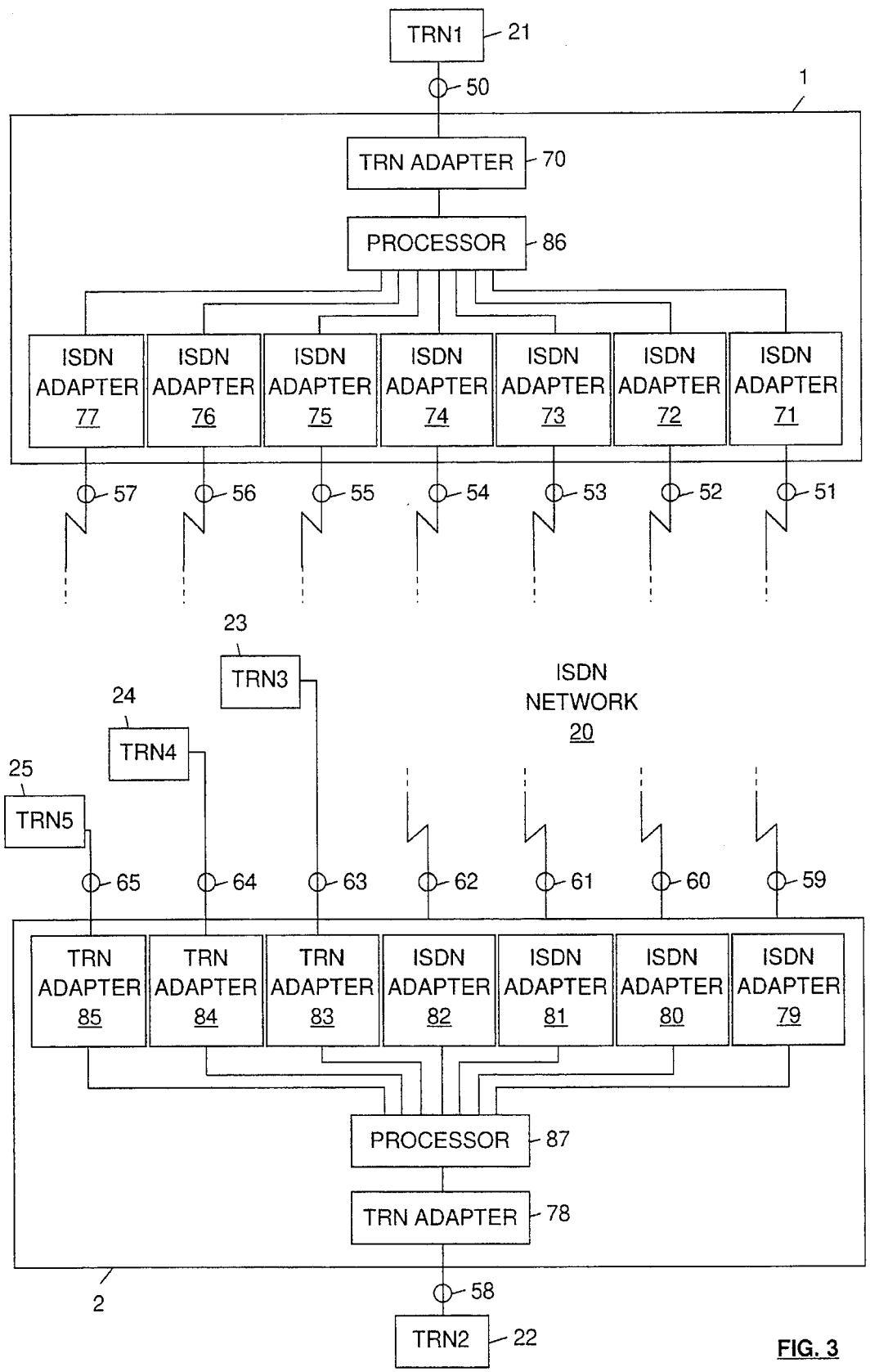
FIG. 3 shows the hardware organization of the multi-port bridge, as shown in FIG. 1, in accordance with the present invention.

FIG. 3 is a diagram of hardware configuration of the multi-port bridge, shown in FIG. 1, in accordance with the invention. Bridge 1 comprises one TRN adapter 70 connected to primary port 50 for segment 21 of Token-Ring network TRN1, other ISDN adapters 71 to 77 connected to other seven secondary ports 51 to 57, respectively, for ISDN network 20, and processor 86 for providing virtual bridges and a virtual Token-Ring between one TRN adapter 70 and other ISDN adapters 71 to 77.

Similarly as bride 1, bridge 2 comprises one TRN adapter 78 connected to one primary port 58 for segment 22 of Token-Ring network TRN2, other ISDN adapters 79 to 82 connected to other four secondary ports 59 to 62, respectively, for ISDN network 20, other TRN adapters 83 to 85 connected to other three secondary ports 63 to 65, respectively, for segments 23 to 25 of Token-Ring networks TRN3 to TRN5, and processor 87 for providing virtual bridges and a virtual Token-Ring between one TRN adapter 78, other ISDN adapters 79 to 82, and TRN adapters 83 to 85.

Figure 4:
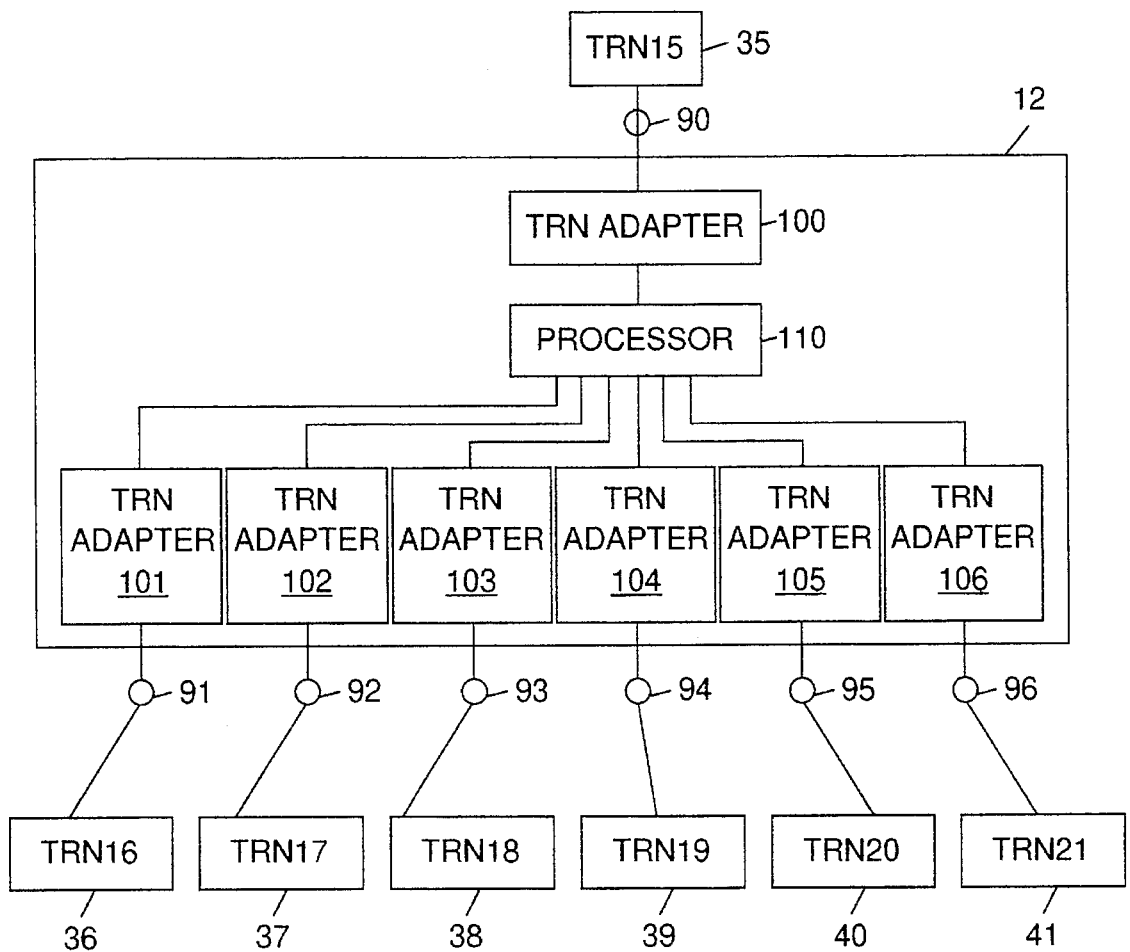
FIG. 4 shows the hardware organization of the multi-port bridge, as shown in FIG. 2, in accordance with the present invention.

Bridge 12, as shown in FIG. 4, comprises one TRN adapter 100 connected to one port 90 for segment 35 of Token-Ring network TRN15, other TRN adapters 101 to 106 connected to other six ports 91 to 96, respectively, for segments 36 to 41 of Token-Ring networks TRN16 to 21, and a processor 110 for providing virtual bridges and a virtual Token-Ring between one TRN adapter 100 and other TRN adapters 101 to 106.

Figure 5:
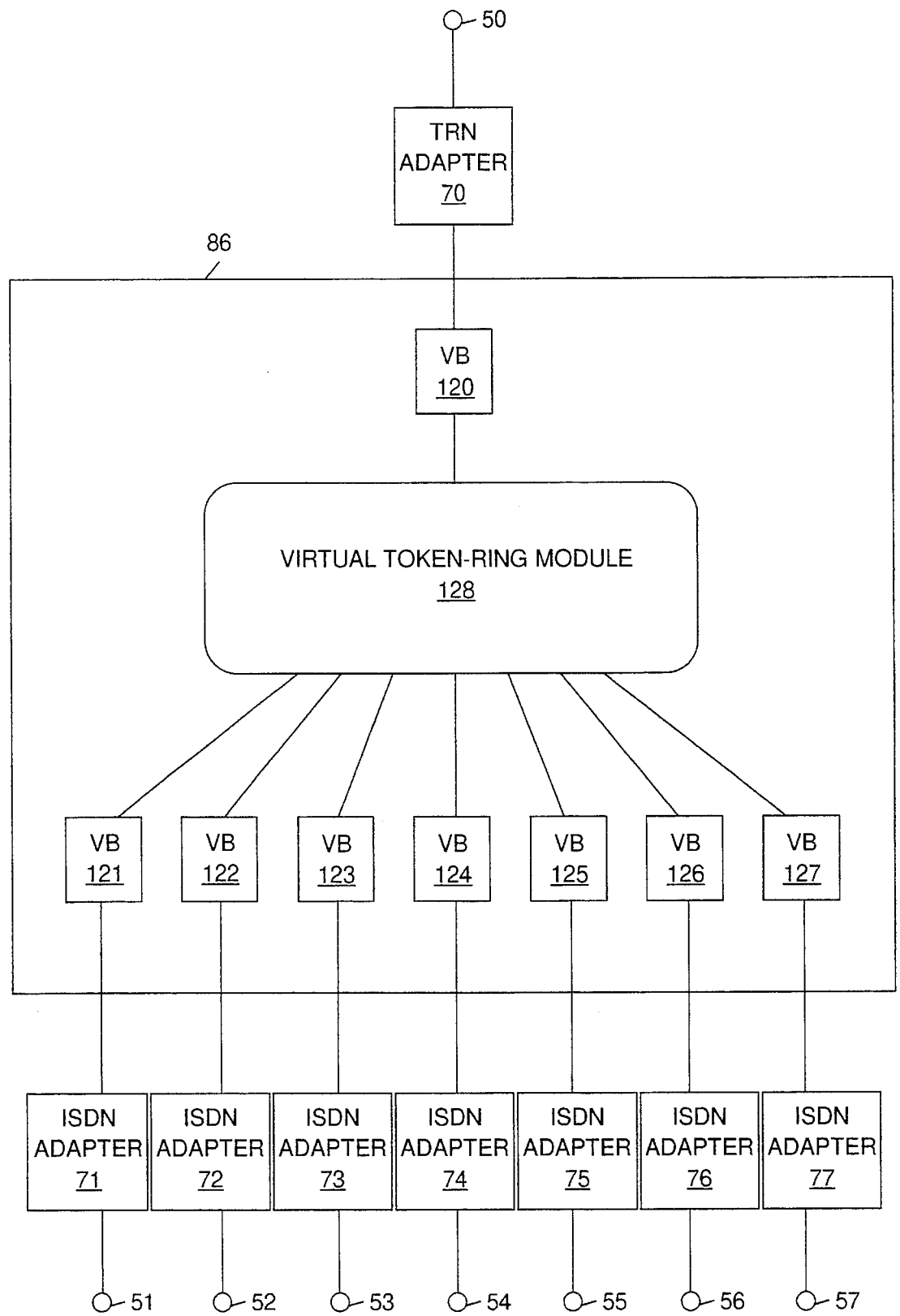
FIG. 5 shows the module organization of the multi-port bridge in accordance with the present invention.

Processor 86 will now be described since there is essentially no difference among processors 86, 87, and 110. FIG. 5 is a sketch of virtual bridges and a virtual Token-Ring provided by processor 86. Processor 86 provides, through a program, virtual bridge module 120 which is capable of bridging to one TRN adapter 70 connected with one primary port 50, and virtual bridge modules 121 to 127 which is capable of bridging to other ISDN adapters 71 to 77 connected with other seven secondary ports 51 to 57, respectively. Processor 86 also provides through the program virtual Token-Ring module 128 for connecting these virtual bridge modules 121 to 127.

Virtual bridge module 120 emulates a bridge, such as source routing bridge to be connected to actual Token-Ring network TRN1 and virtual Token-Ring module 128. On the other hand, virtual bridge modules 121 to 127 emulate a bridge, such as source routing bridge to be connected to other bridges via virtual Token-Ring module 128 and ISDN network 20. Virtual Token-Ring module 128 emulates a Token-Ring for connecting virtual bridge modules 120 to 127.

Source routing is a method of control on frames transferred between multiple LAN segments in a Token-Ring network by using routing information recorded in the frames. In this source routing method, a "route" through which a frame passes from a sending station to receiving station is represented by a string of root identifier which consists of a pair of unique ring number assigned to the LAN segment and bridge number assigned to the bridge connected to the LAN segment, and each root identifier is recorded in a routing information field within a Token-Ring frame by the source routing bridge which connects LAN segments. Therefore, source routing does not require the bridge to have a routing table for routing frames, which is sent from the source station to destination station according to the routing information.

Figure 6:
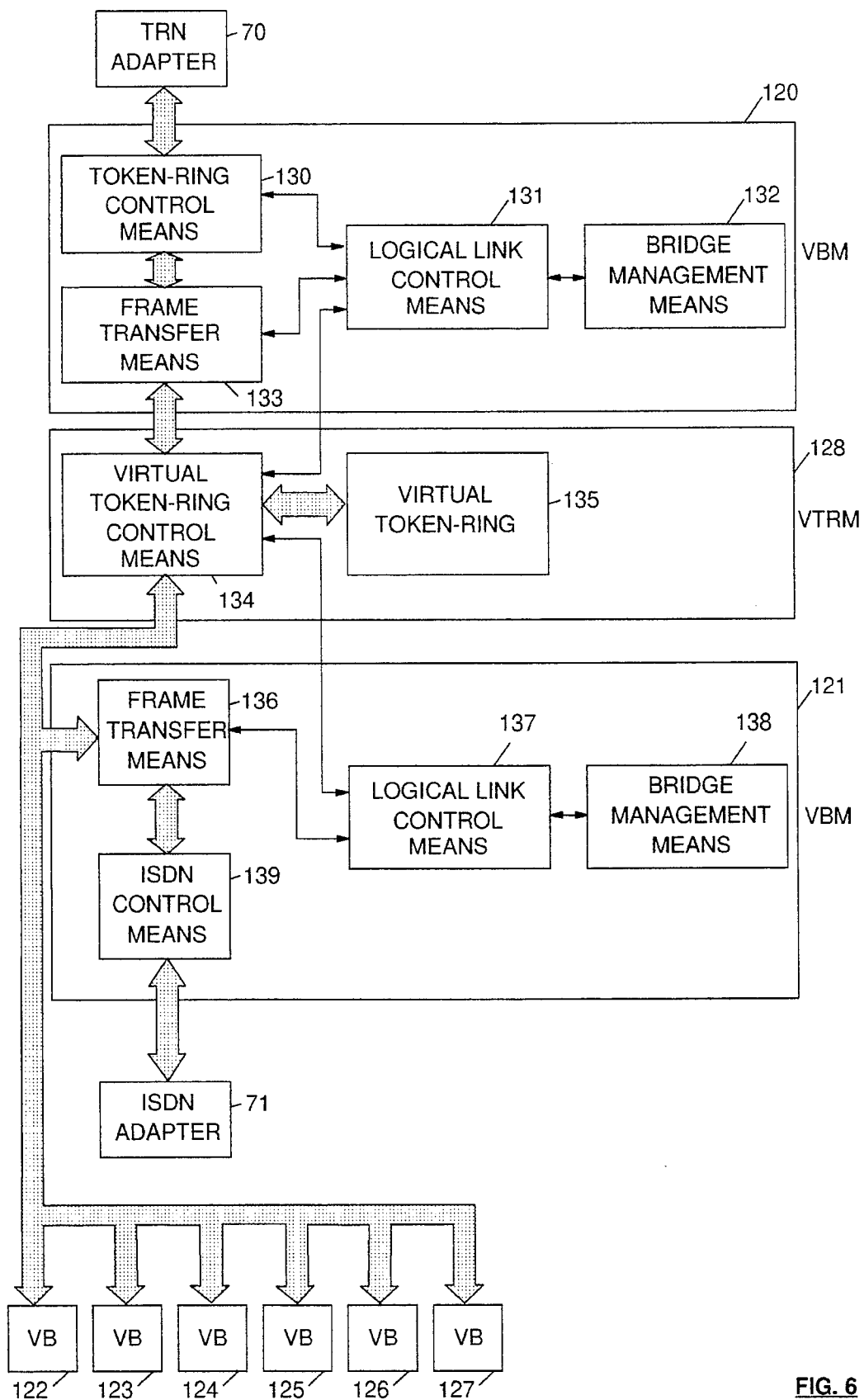
FIG. 6 shows a general block diagram of the multi-port bridge, as shown in FIG. 5, in accordance with the present invention.

FIG. 6 shows a functional block diagram of virtual bridge modules 120 to 127 and virtual Token-Ring module 128. virtual bridge modules 122 to 127 are substantially identical with virtual bridge modules 121 and so not illustrated in detail. Virtual bridge module 120 includes, as shown in FIG. 6, Token-Ring control means 130 having a TRN media access control function, logical link control means 131 having a logical link control function, bridge control means 132 having similar functions to the LAN bridge server and LAN reporting facility for managing virtual bridge module 120 via logical link control means 131, and frame transfer means 133 for frame transfer between a TRN and the virtual Token-Ring.

Virtual Token-Ring module 128 includes virtual Token-Ring control means 134 having a virtual Token-Ring media access control function and virtual Token-Ring 135.

Virtual bridge module 121 includes frame transfer means 136 for frame transfer between an ISDN network and virtual Token-Ring, logical link control means 137 having a logical link control function, bridge control means 138 having similar functions to the LAN bridge server and LAN reporting for managing virtual bridge module 121 via logical link control means 137, and ISDN control means 139 having an ISDN media access control function.

Frame flow will now be described. First, an originating station on Token-Ring network TRN1 issues a frame. Then virtual bridge module 120 captures the frame according to source routing. Virtual bridge module 120 performs necessary processing on the frame and passes it to virtual Token-Ring module 128. Virtual Token-Ring module 128 passes the frame to one of virtual bridge modules 121 to 127 which is determined by the destination address within the frame and routing information. If the frame is to be broadcast, it is passed to all virtual bridge modules 121 to 127. Upon receiving the frame, the virtual bridge module performs necessary processing on the frame and sends it to the bridge being connected via ISDN network 20.

If bridge 2 receives a frame from ISDN network 20, for example, processing required for the frame is done by the virtual bridge module coupled with the port which is connected to bridge 1 via the ISDN line in bridge 2, and the frame is passed by the module to the virtual Token-Ring module of bridge 2. The virtual Token-Ring module to which the frame has been passed transfers the frame to one of the virtual bridge modules coupled with that virtual Token-Ring module which is determined by the destination address within the frame and routing information. On receiving the frame, the virtual bridge module performs processing required for the frame and sends it out to either one or all of segments 22 to 28 of Token-Ring networks TRN2 to TRN8 connected to bridge 2. The above sending and receiving operations of the frame are performed by the bridges connected via ISDN network 20 until the frame reaches the destination station.

The multi-port bridge according to the present invention has the following advantages.

1. Management can be made by the LAN network management program.

Though an existing LAN network management program recognizes only two-port bridges, in this invention, disassembling a multi-port bridge into a number of simple two-port bridges allows the LAN network management program to manage a LAN network including multi-port bridges.

2. The number of virtual two-port bridges is minimum.

There can be more than one approach for disassembling the multi-port bridge into a number of virtual two-port bridges. However, by providing a virtual Token-Ring for the multi-port bridge, as in the present invention, the number of combinations for selecting a pair of ports from N ports can be reduced from $N*(N-1)/2$ to N. This simplifies the structure of the bridge and decreases the number of objects to be managed, thus making the network relatively simple.

3. Each virtual two-port bridge is independent.

Disassembled virtual two-port bridges have an interface through the virtual Token-Ring and thus highly independent with each other. This is important when the LAN network uses multiple bridges to form a spanning tree path. When the multi-port bridge of the present invention is connected to such network, the spanning tree path is formed with the multi-port bridge. That is, the spanning tree path "penetrates" into the multi-port bridge, because individual virtual two-port bridges build the spanning tree path via the virtual Token-Ring.

Also this independence does not necessarily require the LAN segment connecting the port opposite to the virtual Token-Ring side of individual virtual bridges to be the LAN of the same type. Standardizing the interface between the virtual bridge and virtual Token-Ring and designing it to comply with the LAN segment connecting each virtual bridge will achieve connection between different types of LAN.

Moreover, when this bridge is designed as a remote bridge which connects with a wide area network (WAN), each virtual bridge can be used to establish connection between LANs via the wide area network.

4. Dummy address requirements are relieved.

Though the dummy address is still required, the LAN management frame being sent to the dummy address can be readily accommodated by having the virtual Token-Ring module serve all the frames flowing through the virtual Token-Ring (the frames transferred from the virtual bridge or destined to the dummy address).

In accordance with the present invention, there is provided a multi-port bridge where problems in conventional virtual bridging are solved, and especially a multi-port bridge which can be managed with a program that manages only two-port bridges.

We claim:

1. A multi-port bridge for interconnecting a plurality of network segments comprising:

a plurality of virtual bridge modules, each bridge module emulating a bridge protocol to receive frames on an input port and to route the frame to an output port and including a logical link control means having a logical link control function, bridge management means for managing the virtual bridge module through said logical link control means, a media access control means having a media access control function and a frame transfer means for frame transfer; and a virtual Token-Ring module connected to the output port of each one of the plurality of virtual bridge modules, said virtual Token-Ring module emulating a Token-Ring protocol to transport the frames among the plurality of virtual bridge modules wherein said virtual Token-Ring module includes a media access control means having a media access control function.

* * * * *